T. P. WOOLF.
SAW JOINTER.
APPLICATION FILED MAR. 8, 1911.
1,009,613.
Patented Nov. 21, 1911.
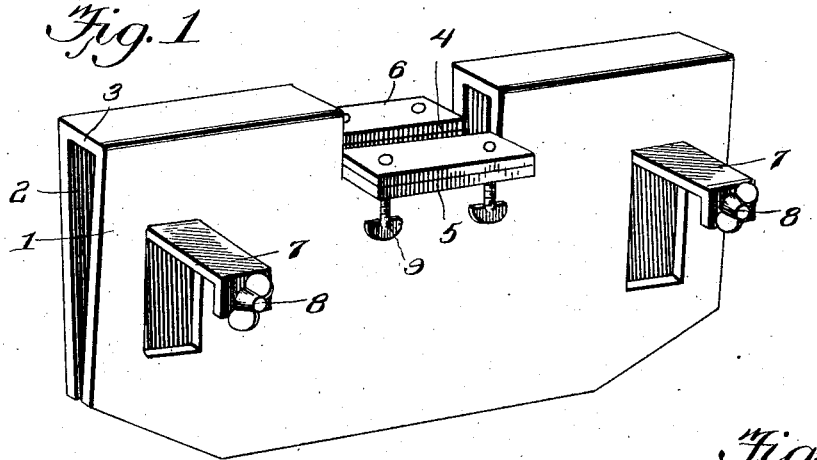
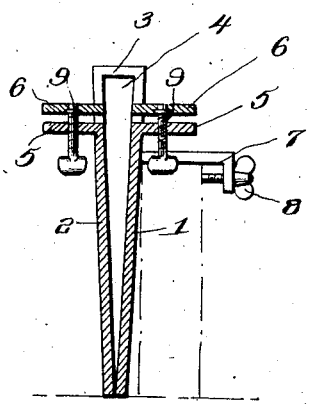
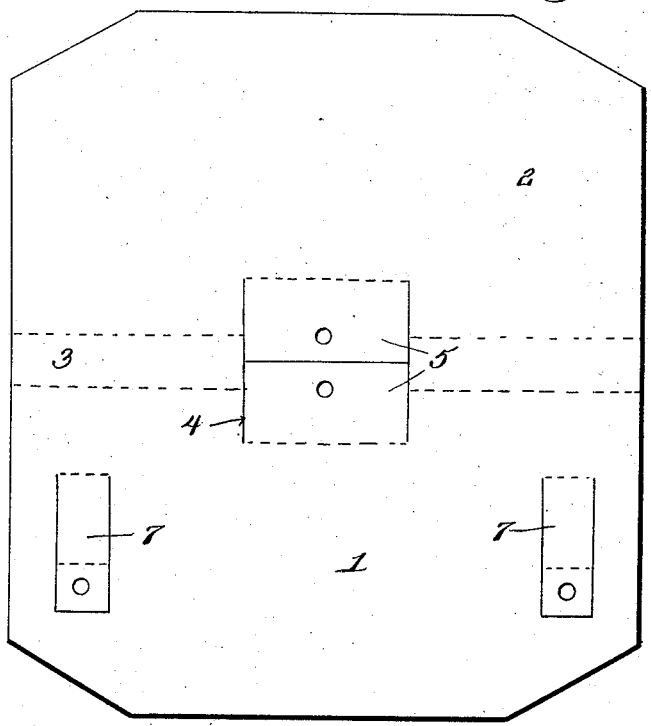
Inventor
Toliver P. Woolf
By Victor J. Evans
Attorney
Witnesses
W. S. McDowell
U. B. Hillyard

UNITED STATES PATENT OFFICE.

TOLIVER P. WOOLF, OF MOELING, LOUISIANA.

SAW-JOINTER.

1,009,613.    Specification of Letters Patent.    Patented Nov. 21, 1911.

Application filed March 8, 1911. Serial No. 613,000.

*To all whom it may concern:*

Be it known that I, TOLIVER P. WOOLF, a citizen of the United States, residing at Moeling, in the parish of Calcasieu and State of Louisiana, have invented new and useful Improvements in Saw-Jointers, of which the following is a specification.

This invention provides a simple device which admits of a saw being jointed and regularly and uniformly filed by the most inexperienced person, the device being of such structure as to clamp opposite sides of the saw blade without the necessity of providing specially devised or independent clamping means.

The device in its structure embodies a frame of peculiar formation formed from a single blank of sheet material, as steel, and having portions partly cut therefrom and pressed outwardly to form guide supports and clamp elements, the blank from which the frame is formed being folded upon itself and the side members being pressed together and possessed of sufficient resiliency to admit of a saw blade passing between them and being clamped thereby.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a perspective view of a saw jointer embodying the invention. Fig. 2 is a transverse section thereof. Fig. 3 is a plan view of the blank from which the frame of the device is formed.

Corresponding and like parts are referred to in the following description, and indicated in all the views of the drawing, by the same reference characters.

The jointer comprises a frame of substantially U-form and embodying side members 1 and 2 and a connecting member 3, the latter adapted to extend over the teeth of the saw to be jointed. An opening 4 is formed in the connecting member 3 at a central point to admit of the teeth of the saw being exposed. Flanges 5 project outwardly from the opening 4 and receive and adjustably support guides 6. Clamp members 7 project laterally from the member 2 and receive set screws 8 by means of which the device is secured to a suitable support when in operation. The flanges 5 have threaded openings to receive set screws 9, which adjustably connect the guides 6 thereto. The side members 1 and 2 are pressed together at their free ends to admit of the saw blade being clamped between them, thereby avoiding the necessity for providing separate means for securing the jointer to the saw blade. The parts of the side members 1 and 2 adjacent the connecting member 3 are spaced apart a distance so as not to engage the teeth of the saw and prevent movement of the jointer thereon.

The frame is formed from a blank substantially as illustrated in Fig. 3, said blank consisting of a piece of sheet metal, preferably steel, which is doubled upon itself, the parts forming the flanges 5 and clamp members 7 being partly cut from the blank and pressed outwardly therefrom substantially as shown. The blank after being folded has the folded part corresponding to the connecting member 3 hardened so as to resist the cutting action of the teeth of the saw when moving the device thereon. The guides 6 consist of plates, which have openings to receive the set screws 9. The opening 4 is of a depth to admit of the teeth of the saw opposite the same projecting. The guides 6 may be adjusted so as to regulate the length of the teeth and insure uniform filing and jointing of the saw being sharpened.

When the device is used for jointing the teeth of a saw a three cornered file may be forced into the space formed between the side members 1 and 2 so as to bear against the connecting member 3, a flat side of the file facing the open side of the space formed between the members 1 and 2 so as to engage with the teeth of the saw. The file is retained in place by the gripping action of the members 1 and 2 and in turn serves to hold the outer edges of the members 1 and 2 apart so that the device may be moved freely over the saw to enable the file to joint the teeth. Another way is to place a flat file against the under side of the clamp members 7 with its inner edge bearing against the member 1 and its outer edge being engaged by the set screws 8, which latter are turned so as to clamp the file. To joint a saw the frame is placed with the member 1 against a side of the saw and with the flat file extending over the teeth, after which the frame is moved forwardly and backwardly to cause the file to cut the teeth.

When the device is used as a gage it is placed upon the saw blade with the members 1 and 2 gripping opposite sides thereof, the raker teeth projecting through the opening 4.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A saw jointer comprising a sheet metal blank doubled upon itself to form a frame of substantially U-form and having a portion at the fold partly cut therefrom to form an opening and pressed outwardly to provide lateral flanges and having portions partly cut from one of the side members and pressed outwardly to form clamp members, set screws fitted to the clamp members, and guides having adjustable connection with the said flanges.

In testimony whereof I affix my signature in presence of two witnesses.

TOLIVER P. WOOLF.

Witnesses:
D. T. SLOCUM,
T. P. McNABB.

---

Copies of this patent may be obtained for five cents each, by addressing the "Commissioner of Patents, Washington, D. C."